Patented Nov. 8, 1949

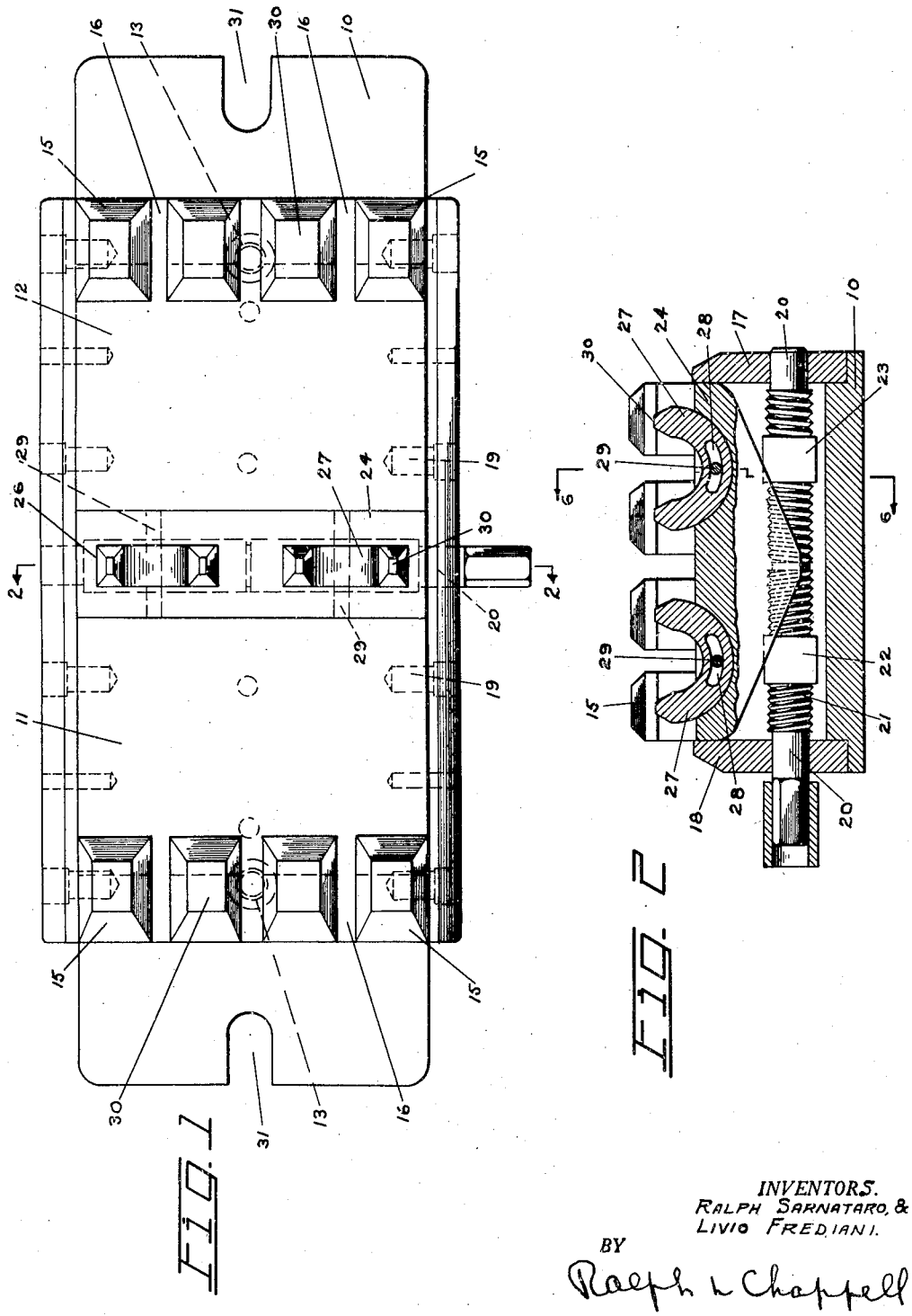

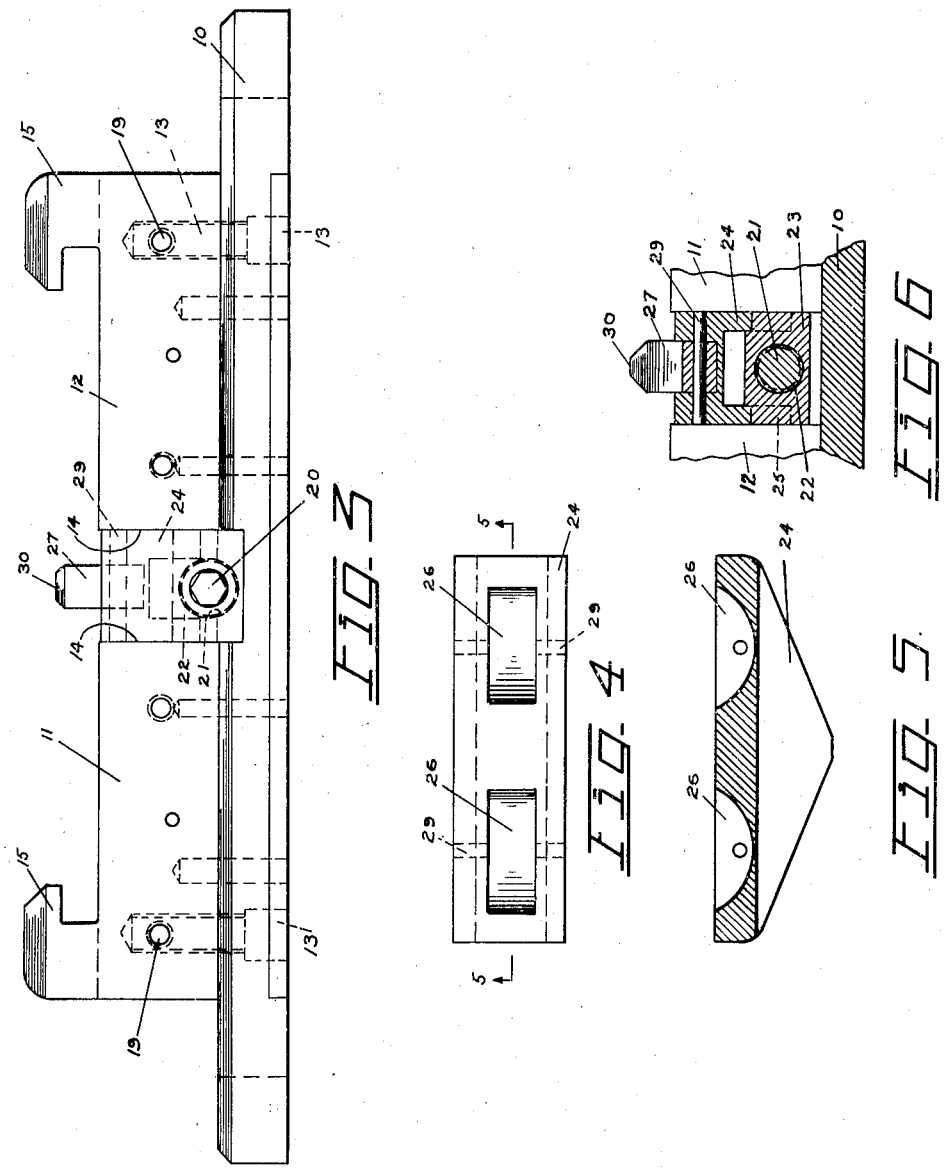

2,487,072

UNITED STATES PATENT OFFICE 2,487,072

FIXTURE

Ralph Sarnataro and Livio Frediani,
New York, N. Y.

Application August 6, 1945, Serial No. 609,311

2 Claims. (Cl. 90—59)

(Granted under the act of March 3, 1883, as
amended April 30, 1928; 370 O. G. 757)

This invention relates to a fixture or holding device for rigidly retaining metal sheets in position while the sheets are machined or cut.

An object of this invention is to provide a fixture with an adjustable base for readily locking and readily releasing a metal sheet that is to be cut or machined.

Another object is to provide a fixture with a locking means that supports and retains curved as well as flat sheets on the same milling machine.

Another object is to provide a fixture with holding and locking means such that the cutting tools are not damaged by vibrations of the metal sheet or metal holder during the cutting process.

Another object is to provide a fixture with novel gripping means to expedite the securing and loosening of the material that is to be machined.

Further objects and advantages of this invention, as well as its construction, arrangement and operation, will be apparent from the following description and claims in connection with the accompanying drawings, in which:

Fig. 1 is a plan view of this invention.

Fig. 2 is a section taken substantially along the line 2—2 of Fig. 1.

Fig. 3 is a front elevation view, partly in section, of this invention.

Fig. 4 is a plan view of the ramp member forming a part of this invention.

Fig. 5 is a section taken along the line 5—5 of Fig. 4.

Fig. 6 is a section taken along the line 6—6 of Fig. 2.

In many large industrial tool shops, the welders who are hired must be examined, not only prior to their being hired, but also periodically during their employment, to determine their fitness as welders. The welders under examination weld two strips of metal together, the weld being then subjected to various tests to determine whether the sample weld conforms to the specifications of a satisfactory weld.

Because the single weld has to undergo various tests, it is necessary to cut the sample weld into several pieces at right angles to the weld so that each piece is a welded segment. Previous methods of securing these sample welds for cutting are inadequate. Oftentimes the fixture or support that holds the sample weld in preparation for cutting does not securely retain the sample during cutting or machining of the sample weld, the vibrations resulting when the fast spinning rotary blades make contact with the inadequately secured sample weld causing the blades to jam, break, or be severely damaged.

If the securing of said sample weld is firm, it is usually accomplished by using metal bolts and straps to tie down the sample weld to a pair of parallel supports prior to guiding cutting blades between such parallel supports. This method is unwieldly and slow, much time being lost in securing and releasing the sample to the parallel supports.

Fig. 1 shows a base plate 10 on which are mounted two jaw blocks 11 and 12 secured to the base plate 10 by set screws 13, or any other suitable means. The blocks 11 and 12 are disposed on the base plate 10 so that a channel 14 is formed between the jaw blocks 11 and 12 approximately in the center of the base plate 10. Arising from the rear of the top face of each block 11 and 12 are teeth 15, the spaces 16 between said teeth being of sufficient width to permit the unobstructed passage of a rotary blade. The number of teeth 15 that arise, at spaced intervals, from the blocks 11 and 12 is determined by the number of blades set on a single shaft that are to be used in cutting a sample weld placed between the opposing teeth 15 of this fixture.

Lying in the channel 14 shown in Fig. 2 are support means 27. There is shown in Fig. 2 the base plate 10 on which side plates 17 and 18 rest with plates 17 and 18 being secured to the sides of the jaw blocks 11 and 12 by set screws 19 (Fig. 3).

Openings or bores are cut in these plates 17 and 18, said bores serving as bearing supports for the shaft 20 of a feed screw 21. The feed screw 21 engages a right hand adjustable nut 22 and a left hand adjustable nut 23. The turning of the shaft 20 either urges the nuts 22 and 23 towards or away from each other, depending upon the direction of turning of the feed screw 21.

The top faces of the nuts 22 and 23 ride under a double-ramp member 24 and engage the legs 25 (Fig. 6) of the double-ramp member 24. The turning of the feed screw 21 so as to draw the adjustable nuts 22 and 23 closer together raises the ramp member 24, whereas turning of the feed screw 21 in an opposite direction causes the adjustable nuts 22 and 23 to move farther apart from each other, causing the ramp member 24 to lower. Formed in the top of the ramp member 24 are spaced slots 26 cut part way into the ramp 24. The slots 26 are arcuate so as to accommodate supports 27. Each support 27 has an arcuate slot 28 near its lowest portion. A pin 29 passes through each slot 28 so that each support 27 is constrained to rotate within its slot 26 when pressure is exerted at either finger 30 of the support 27. The pin 29 is supported at its ends in the facing walls of the ramp 24.

The channel 14 (Fig. 1) can be flooded with oil, graphite grease, or other suitable lubricating means to bathe the shaft 20, the feed screw 21, and the movable nuts 22 and 23. At convenient locations in the base plate 10 are suitable slots 31 to enable this fixture to be secured to a firm base of a lathe.

In the operation of this device, the shaft 20 is rotated until the supports 27 are sufficiently depressed to permit the insertion of a metal sheet between the jaws or teeth 15. The shaft 20 is then rotated until the fingers 30 are urged against the bottom face of the inserted metal sheet, locking it rigidly in the holder. Should the metal sheet be slightly curved or deformed, as happens when the heat required for welding distorts the pieces of metal that are welded together, the fingers 30 rotate and become adjusted to the irregularities of the bottom face of the metal plate. Thus, by having the fingers 30 rotatably mounted, pressure on the fingers 30 is equally distributed, fingers 30 adjusting themselves so as to avoid too much strain on a single finger 30.

This holder or fixture can be provided with many more teeth 15 than are shown, the number of supports 27 can be increased, and the holder can be constructed in various sizes to meet the needs of a particular industry or tool shop. This holder is readily attachable to a lathe, is exceedingly simple to operate, and considerably speeds up the securing and releasing of metals that are held by it for a cutting, drilling, or stamping process. Moreover, this fixture eliminates the damaging vibrations imparted to the cutting blades of a rotary saw by improperly secured work pieces.

It is to be understood that various modifications and changes can be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A fixture comprising a base, fixed means on said base for engaging a workpiece, a feed screw rotatably mounted on said base, means for retaining said screw against axial movement, right-hand and left-hand threads on said feed screw, a pair of nuts one on each of said threads for simultaneous movement toward and away from each other when said screw is rotated, a member opposed to said workpiece-engaging means and slidably mounted on said base for movement toward and away from said feed screw and workpiece-engaging means at right angles thereto, said member having a pair of oppositely inclined surfaces resting one on each of said nuts, and means on said member for engaging the workpiece.

2. In a work holder having a base for engaging a workpiece, a feed screw on the base, right-hand and left-hand threads in said feed screw, a pair of nuts one on each of said threads for simultaneous movement toward and away from each other, and a work-engaging member slidably mounted on said base for movement toward and away from said feed screw at right angles thereto, said member having a pair of oppositely inclined surfaces resting one on each of said nuts.

RALPH SARNATARO,
LIVIO FREDIANI.

REFERENCES CITED

The following references are of record in the file of this patent:

UNITED STATES PATENTS

| Number | Name | Date |
| --- | --- | --- |
| 419,073 | Richards | Jan. 7, 1890 |
| 685,078 | Willringhaus | Oct. 22, 1901 |
| 819,961 | Vaughan | May 8, 1906 |
| 1,335,247 | Lask | Mar. 30, 1920 |
| 1,425,275 | Paulsen | Aug. 8, 1922 |
| 2,338,603 | Schultz | Jan. 4, 1944 |